(12) United States Patent
Alloin et al.

(10) Patent No.: US 8,687,770 B2
(45) Date of Patent: Apr. 1, 2014

(54) SYSTEMS AND METHODS FOR PERFORMING LINE IMBALANCE MEASUREMENT AND MITIGATION BASED ON A COMMON MODE SENSOR

(75) Inventors: Laurent Francis Alloin, Monmouth Beach, NJ (US); Arnold Muralt, Fair Haven, NJ (US); Laurent Pierrugues, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 131 days.

(21) Appl. No.: 13/095,421

(22) Filed: Apr. 27, 2011

(65) Prior Publication Data

US 2011/0268258 A1 Nov. 3, 2011

Related U.S. Application Data

(60) Provisional application No. 61/329,407, filed on Apr. 29, 2010.

(51) Int. Cl.
*H04M 1/24* (2006.01)
*H04M 3/08* (2006.01)
*H04M 3/22* (2006.01)

(52) U.S. Cl.
USPC ........... 379/1.04; 379/12; 379/22.02; 379/23; 379/27.03

(58) Field of Classification Search
USPC .......... 379/1.01, 1.03, 1.04, 22.02, 22.07, 24, 379/27.01, 29.01, 30, 32.01, 32.02, 32.04, 379/12, 23, 27.03; 324/521, 523, 525, 527
See application file for complete search history.

(56) References Cited

U.S. PATENT DOCUMENTS

| | | | |
|---|---|---|---|
| 5,654,982 A * | 8/1997 | Goodson et al. | 375/222 |
| 6,236,714 B1 * | 5/2001 | Zheng et al. | 379/1.03 |
| 6,385,297 B2 * | 5/2002 | Faulkner et al. | 379/1.04 |
| 6,999,504 B1 | 2/2006 | Amrany et al. | |
| 7,200,223 B2 | 4/2007 | Fortier | |
| 7,430,291 B2 | 9/2008 | Washburn et al. | |
| 2001/0012333 A1 * | 8/2001 | Faulkner et al. | 379/27.01 |
| 2002/0067802 A1 * | 6/2002 | Smith et al. | 379/1.04 |
| 2005/0152385 A1 | 7/2005 | Cioffi | |
| 2006/0067396 A1 * | 3/2006 | Christensen | 375/232 |
| 2006/0187004 A1 * | 8/2006 | Vollmer et al. | 340/310.11 |
| 2008/0012658 A1 | 1/2008 | Fortier | |
| 2008/0106270 A1 * | 5/2008 | Crick | 324/613 |
| 2010/0271039 A1 * | 10/2010 | Durston et al. | 324/533 |

OTHER PUBLICATIONS

PCT International Search Report and Written Opinion in co-pending, related PCT Application No. PCT/US2011/34245, dated Jul. 8, 2011.

* cited by examiner

*Primary Examiner* — Binh Tieu
(74) *Attorney, Agent, or Firm* — Pillsbury Winthrop Shaw Pittman LLP

(57) ABSTRACT

One embodiment is a method for performing 2-wire line imbalance measurements. The method comprises receiving a probe signal and based on the probe signal, determining one of more of: an estimated transverse conversion loss (TCL) coupling transfer function and an estimated transverse conversion transfer loss (TCTL) coupling transfer function.

22 Claims, 10 Drawing Sheets

SYSTEMS AND METHODS FOR PERFORMING LINE IMBALANCE MEASUREMENT AND MITIGATION BASED ON A COMMON MODE SENSOR

CROSS-REFERENCE TO RELATED APPLICATION

This application claims priority to, and the benefit of, U.S. Provisional Patent Application entitled, "Common Mode Sensor and Mitigator for SmartCPE," having Ser. No. 61/329,407, filed on Apr. 29, 2010, which is incorporated by reference in its entirety.

TECHNICAL FIELD

The present disclosure generally relates to digital subscriber line systems and specifically to the use of a common mode sensor and mitigator for reducing the conversion of common mode signals to differential mode signals.

BACKGROUND

In a digital subscriber line (xDSL) communication system, loop imbalance with respect to ground results in unwanted external noise being coupled into differential mode transmissions and being superimposed onto the desired xDSL signal transmitted on a twisted pair. Such noise sources include far-end cross talk (FEXT), near-end crosstalk (NEXT), radio frequency interface (RFI), impulse noise, power line communication (PLC) interference, and so on. The ITU-T standard defines requirements relating to longitudinal conversion loss (LCL) for terminating equipment to be greater than 38 dB, in order for the equipment (whether a customer premises equipment (CPE) or central office (CO) transceiver) not to be the limiting factor in the system.

However, the ITU-T standard currently does not define a loop imbalance requirement of twisted pairs as part of the G.--LT (single end loop test (SELT), dual end loop test (DELT), metallic loop test (MELT)) or G.993.2/G.992.3 standards that allows one to qualify in-situ the loop balance characteristics and its impact on the DSL bands being used. The ITU-T standard also does not define the values of the common mode impedance of the terminating equipment required to reduce propagation of common mode signals.

SUMMARY

Briefly described, one embodiment, among others, is a method for performing 2-wire line imbalance measurements. The method comprises receiving a probe signal and based on the probe signal, determining one of more of: an estimated transverse conversion loss (TCL) coupling transfer function and an estimated transverse conversion transfer loss (TCTL) coupling transfer function.

Another embodiment is a method for performing imbalance measurements. The method comprises receiving, at a dual sensor receiver implemented in a transceiver, a probe signal and determining, based on the probe signal, parameters for an impedance matching circuit (AIC) coupled to a loop between two or more transceivers. The method further comprises applying the determined parameters to the AIC to mitigate common mode noise on the loop.

Another embodiment is an apparatus for performing imbalance measurements. The apparatus comprises a sensor circuit configured to receive a probe signal, the sensor circuit further configured to determine one or more of based on the probe signal: an estimated transverse conversion loss (TCL) coupling transfer function and an estimated transverse conversion transfer loss (TCTL) coupling transfer function based on a dual sensor receiver.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
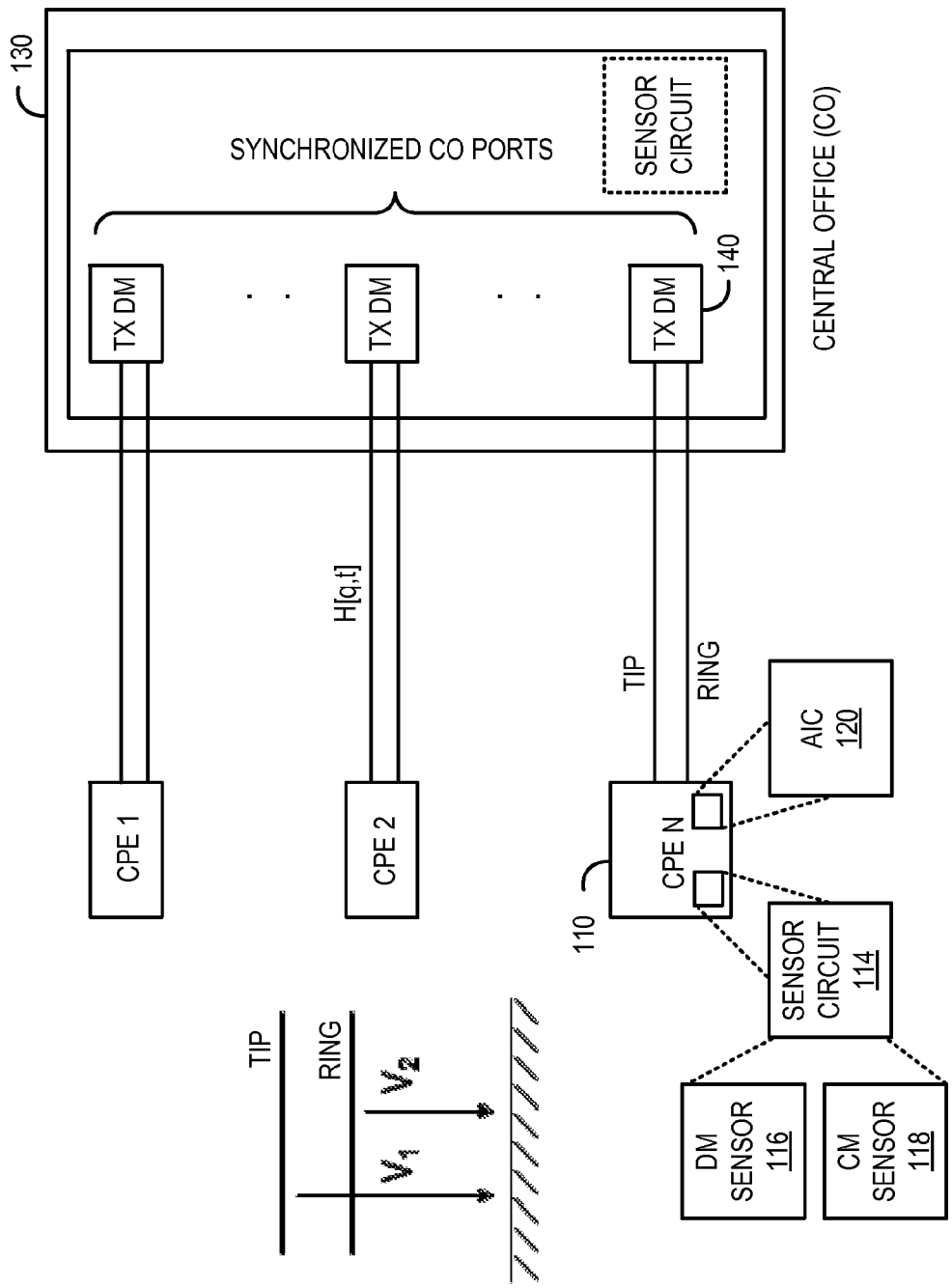
FIG. 1 is a communication system in which embodiments for performing loop imbalance measurements are implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As part of a noise and loop impairment identification and classification scheme, the measurement of the loop imbalance contains valuable information for a service provider as the measurement reflects the susceptibility of the loop to external interference or to the likelihood of the loop itself radiating external interference. Generally, an imbalanced twisted pair with respect to ground will radiate external interference by converting differential signals to common mode signals and vice versa. These common mode signals may become a source of disturbances to other services (PLC receivers, AM and HAM radio receivers) or contribute to the increase of self-FEXT and self-NEXT for other VDSL services sharing the same cable binder. On the other hand, an imperfect twisted pair that is imbalanced to some degree with respect to ground tends to be more susceptible to external interference. Specifically, some of the common mode signals present on a twisted pair and induced by an external source (PLC transmitters, AM, HAM transmitters) will have a greater susceptibility to being converted to differential noise signals affecting the DSL capability of the imperfect twisted pair.

Imbalanced tip and ring pairs comprising a twisted pair occur as a result of cable imperfection during manufacturing (such as wire and twist variations), or more significantly during placement/installation, during which bends and impartial twisting may be introduced at both ends of the cable. Furthermore, the existence of non-twisted pairs in the drop which do not present proper imbalance with respect to earth (as opposed to a cable sheath in which twisted pairs are generally enclosed) may actually enhance an imbalance measurement. Finally, split-pair configurations in which wires of different twisted pairs are inadvertently paired to carry a DSL signal will produce an abnormally high level of imbalance. A short of either the tip or ring to ground (which may occur inadvertently) also results in an imbalance measurement.

It should be emphasized that while various embodiments are described in the context of a VDSL CPE receiver, the concepts can be extended to the CO and to ADSL systems in general. The concepts can also be extended to any 2-wire system such as those specified in ITU committee standards G.996.0/G.997.2 G.hn between two transceivers. Generally, a transceiver is a device that comprises both a transmitter and a receiver that are combined and that share common circuitry. In the context of VDSL systems, CO and CPE devices comprise the two transceivers under consideration. Reference is made to FIG. 1, which is a communication system in which embodiments for measuring and transmitting loop imbalance measurements are implemented. The central office (CO) 130 comprises various synchronized CO ports 140 configured to transmit differential mode (DM) signals to corresponding customer premises equipment (CPE) over twisted pair comprising tip and ring. Each CPE 110 comprises a sensor circuit 114, which further comprises a differential mode sensor 116 and a common mode sensor 118. The CPE 110 receives test signals from the CO port and processes the test signals to provide transverse conversion loss (TCL)/transverse conversion transfer loss (TCTL) loop diagnostics. The CPE 110 further comprises a common mode adjustable impedance circuit (AIC) 120, which will be described in more detail later.

The general metrics relating to common mode (CM)/differential mode (DM) loop imbalance is now discussed. FIG. 1 further illustrates the various voltage potentials relating to tip and ring with respect to ground. Generally, DM and CM voltages are derived for a given twisted pair loop with respect to ground.

$$V_{DM}=V_2-V_1 \text{ (Differential mode)} \quad (1)$$

$$V_{CM}=(V_1+V_2)/2 \text{ (Common mode)} \quad (2)$$

Based on these voltages, four different coupling measurements can be derived across a two-port network, which represents a twisted pair. Longitudinal conversion loss (LCL) represents the degree of unwanted conversion of differential mode signal following the presence of a common mode signal on one side of a two port network. Longitudinal conversion transfer Loss (LCTL) represents the degree of unwanted conversion of differential mode signal at the output of a two-port network following the presence of a common mode signal at the input port.

Transverse Conversion Loss (TCL) represents the degree of unwanted conversion of common mode signal following the presence of a differential mode signal on one side of a two port network. Transverse conversion transfer loss (TCTL) represents the degree of unwanted conversion of common mode signal at the output of a two-port network following the presence of a differential mode signal at the input port. Based on construction of a twisted pair, the LCL and TCL measurements are typically symmetrical, and the same generally applies for the LCTL and TCTL measurements. A measure of the loop imbalance provides operators with a diagnostic tool that can help locate faults in the loop plant or correlate high disturbance sources with specific loops. An imbalance measurement also serves as a figure of merit by which loops can be classified either as a potential disturber and/or a potential victim. Finally, imbalance measurements aid in the adaptation process of the receiver front end in order to address imbalance conditions and ultimately maximize transmission performance of the DSL system.

Figure 4:
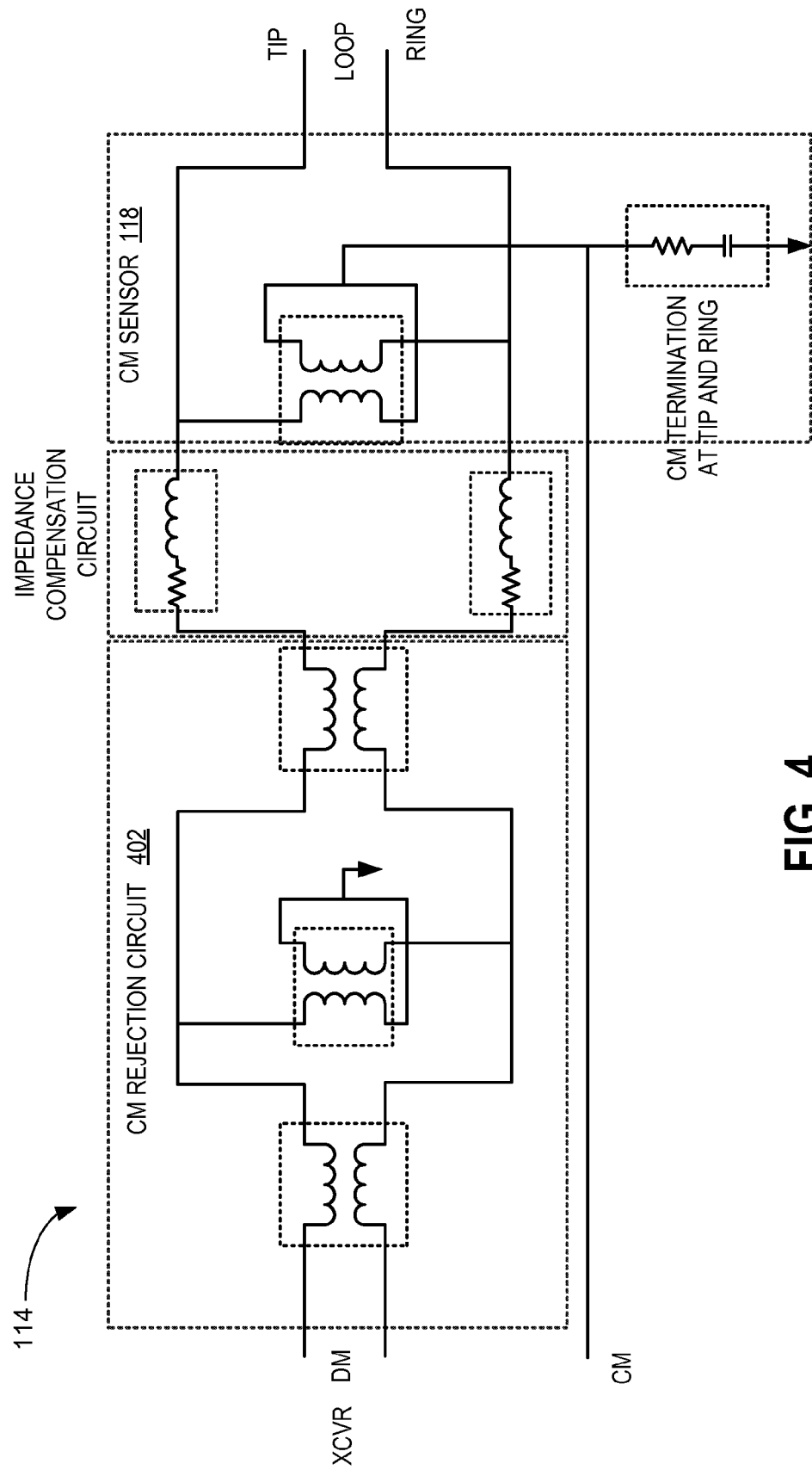
FIG. 4 depicts an embodiment of the sensor circuit in FIG. 1 comprising DM and CM sensors for performing the various measurements.

In accordance with various embodiments, the CPE includes a second sensor that operates in common mode. Specifically, a dual sensor receiver (DSR) configuration implemented at the CPE is used to mitigate the impact of external noises. This device uses a second sensor at the receiver which may be based on a common mode signal (the concept of one sensor can also be extended to multiple sensors used by a same receiver). The common mode signal is constructed from the differential mode signal in the analog front end. Reference is made to FIG. 4, which depicts an embodiment of the sensor circuit 114 in FIG. 1 comprising DM and CM sensors 116, 118 for performing the various measurements. Additional details regarding the use of a common mode signal to obtain additional information that can be used to better approximate the transmitted signal are disclosed in U.S. Pat. No. 6,999,504, entitled "System and Method for Canceling Crosstalk," filed Mar. 15, 2001, herein incorporated by reference in its entirety.

Embodiments of the dual mode sensor circuit 114 are configured to accurately sense the DM and CM signals present independently on the tip and ring interface. This goal is achieved by providing high CM rejection towards the transceiver in order to reject CM signals originating in the transceiver. This is performed using a CM rejection circuit 402. Various embodiments also seek to incorporate a high degree of longitudinal balance so that the dual mode sensor does not degrade the CM signal measurement sensitivity due to DM-to-CM conversion due to a low longitudinal balance of the dual mode sensor. For some embodiments, a CM impedance of approximately 100 Ohms+0.15 uF is implemented. Various embodiments of the sensor circuit 114 are configured to minimize insertion loss in order to minimize the impact on downstream signals and have a minimal impact on transceiver performance.

The common mode signal can be processed independently of the differential mode in analog or by a digital signal processor. By incorporating the sensor circuit 114 in DSL transceivers and by transmitting a differential probe signal and by processing the received differential mode and common mode signal a measurement of the loop imbalance in-situ can be conducted. As common mode signals are received by the second sensor, the CPE is capable of estimating the different CM/DM coupling measurements described earlier.

The propagation of common mode noise such as RFI or PLC from the common mode to the differential operates through LCL and LCTL coupling. The DSL system is not able to transmit common mode signal in a control matter but is only limited to differential mode transmission. As a consequence the LCL and LCTL cannot be estimated directly. But by construction of the twisted pair the LCL and TCL couplings should be considered symmetrical as well as are the LCTL and the TCTL. And it is possible to transmit DM signal and received at the CPE, with a DSR device the common mode signal and thus estimate the TCL and TCTL coupling.

Figure 2:
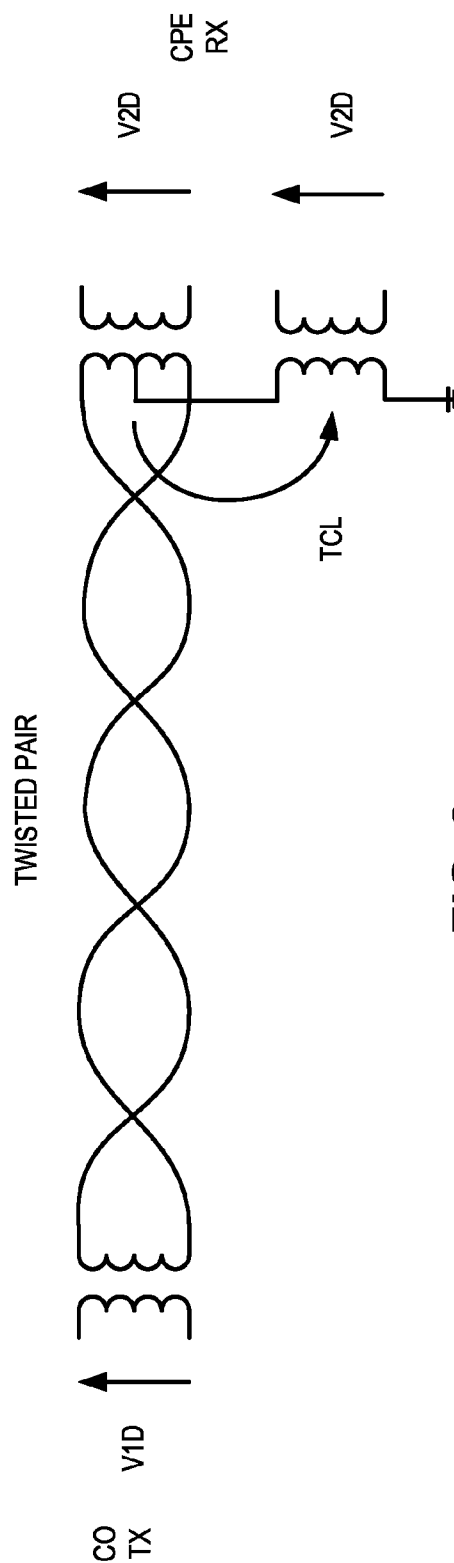
FIGS. 2 and 3 illustrate how a TCL transfer function can be determined by applying a purely differential input signal at the CPE and measuring the common mode output voltage at the CPE.
Figure 3:
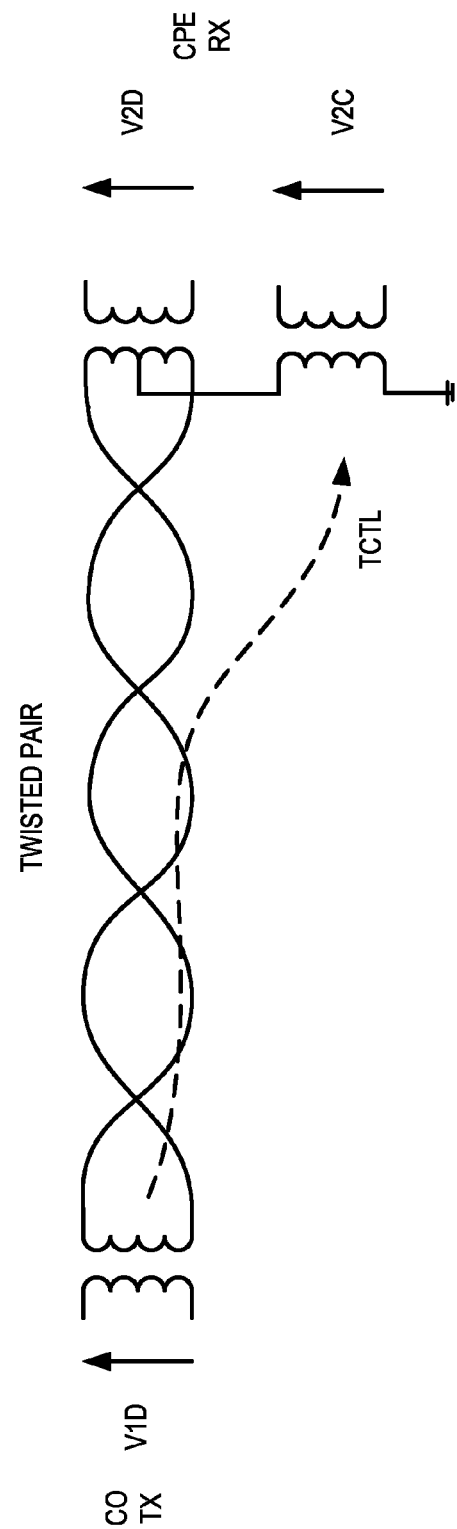

TCL is essentially identical to LCL and is a measure of the near end imbalance of the loop as seen by the CPE receiver. As illustrated in FIG. 2, the TCL transfer function can be determined by applying a purely differential input signal at the CPE and measuring the common mode output voltage at the CPE. Transverse conversion transfer loss (TCTL) is essentially identical to the LCTL and is a measure of the total imbalance of the loop as seen by the CPE receiver. With reference to FIG. 3, the TCTL transfer function is determined by applying a pure differential input signal at the CO and measuring the common mode output voltage at the CPE. Note that while FIGS. 2 and 3 depict measurements taken at the CPE side, the same LCL or LCTL measurement estimation can be performed with a sensor circuit implemented on the CO side (as depicted in FIG. 1).

Having described the basic framework for providing TCL/TCTL loop diagnostics, embodiments of a signaling scheme are now described for conveying the estimation. A signaling scheme is used in conjunction with the differential pair used for performing the LCL, or LCTL measurement, where the signaling scheme is based on ITU committee G.993.2/G.992.3/G.993.5 VDSL2 and ADSL2 signal sequences or G.996.0/G.997.2 G.hn signal sequences. The ITU standard defines various sequences such as O/R-P-Channel-Discovery, O/R-P-Vector 1 during the discovery phase, O/R-P-Training, O/R-P-Vector 1 during the training Phase, and O/R-P-Medley during the analysis phase. The standard also defines the Sync symbols during Data Mode. For various embodiments, these sequences can be used as probe sequences transmitted by the CO, where the probe sequences are known by the CPE. For sake of simplicity, embodiments are described using the O/R-P-Medley sequence, also known as Medley or Sync symbols. However, the embodiments described can be extended to use any probe reference defined in the ITU standard.

In accordance with some embodiments, a Medley-type signal is utilized as a probing signal that is transmitted on the line differentially. This probing signal is characterized by the modulation by an inverse fast Fourier transform (IFFT) operator of N carriers spaced by 4.3125 kHz or 8.625 kHz. The N modulated carriers (up to 4096) are mapped with a 4-QAM (quadrature amplitude modulation) known constellation points that are either 00 or 11. The constellation points are then rotated based on a quadrant scrambler used in reset mode as specified for the sync symbol. After the mapping process, the N complex frequency domain signal is converted to a 2 N point real time domain signal. A cyclic extension and windowing are added to avoid inter-symbol interference (ISI) and so that the signal complies to a well-defined power spectral density (PSD) mask. At the tip and ring, the signal complies with the band plan used and associated maximum PSD levels, as well as the direction of the transmission upstream or downstream.

Various embodiments are configured to receive a wideband, probe signal carrying measurements, where the received probe signal comprises a known sequence type at an appropriate PSD level on the differential input of the loop under test, thereby enabling a coherent demodulation of the probe signal at the local or remote common mode receiver. A transfer function associated with the conversion loss (LCL, LCTL) can be obtained using amplitude and phase information associated at each frequency of the entire band of the transmission.

Figure 5:
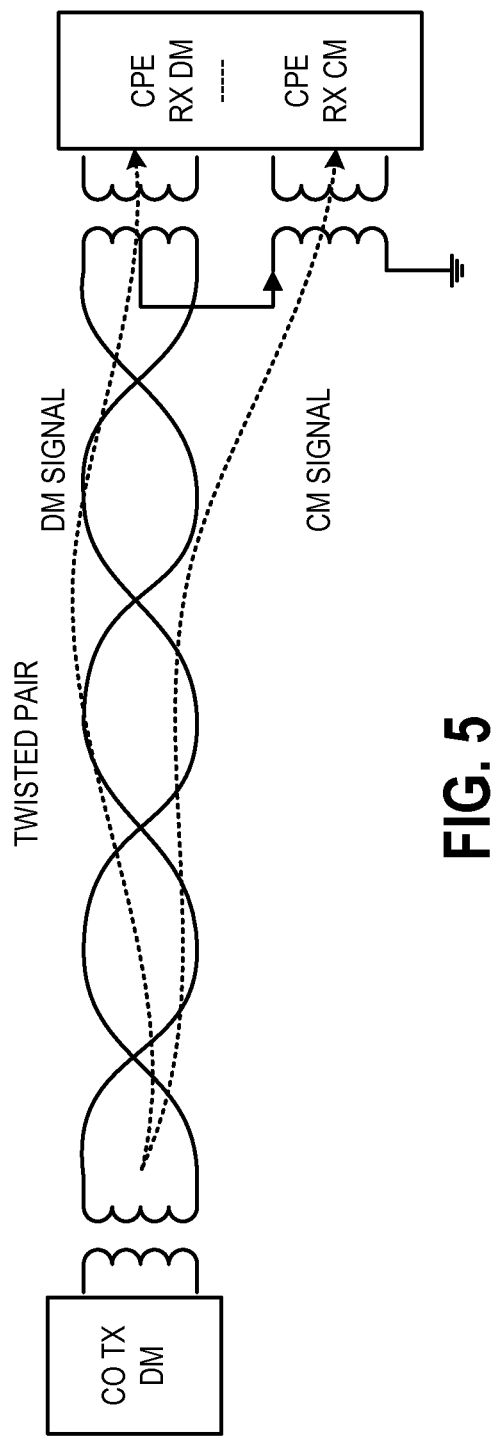
FIG. 5 illustrates how synchronization with the CO transmit remote end is achieved using primarily the timing information that is extracted from the DM signal by the CPE DM receiver.

To achieve coherent demodulation of the probe signal, synchronization and frame boundary detection is implemented for various embodiments prior to removal of the cyclic extension. An FFT operation is then performed to demodulate the N carriers. While the single ended measurement of LCL only requires frame boundary detection of the OFDM/DMT symbol, a dual ended measurement involved in measuring LCTL requires frequency lock—that is, timing synchronization of two remote ends. To facilitate such synchronization, the acquisition and lock to the transmitter timing information is either performed via the CM port or via the DM port of the DSR. Frame boundary detection may also be performed either on the DM port in support of the CM port, or directly on the CM port, in order to facilitate the coherent demodulation of the weaker CM signal on the receiver side CM port. With reference to FIG. 5, synchronization with the CO transmit remote end is achieved using primarily the timing information that is extracted from the DM signal by the CPE DM receiver.

Figure 6:
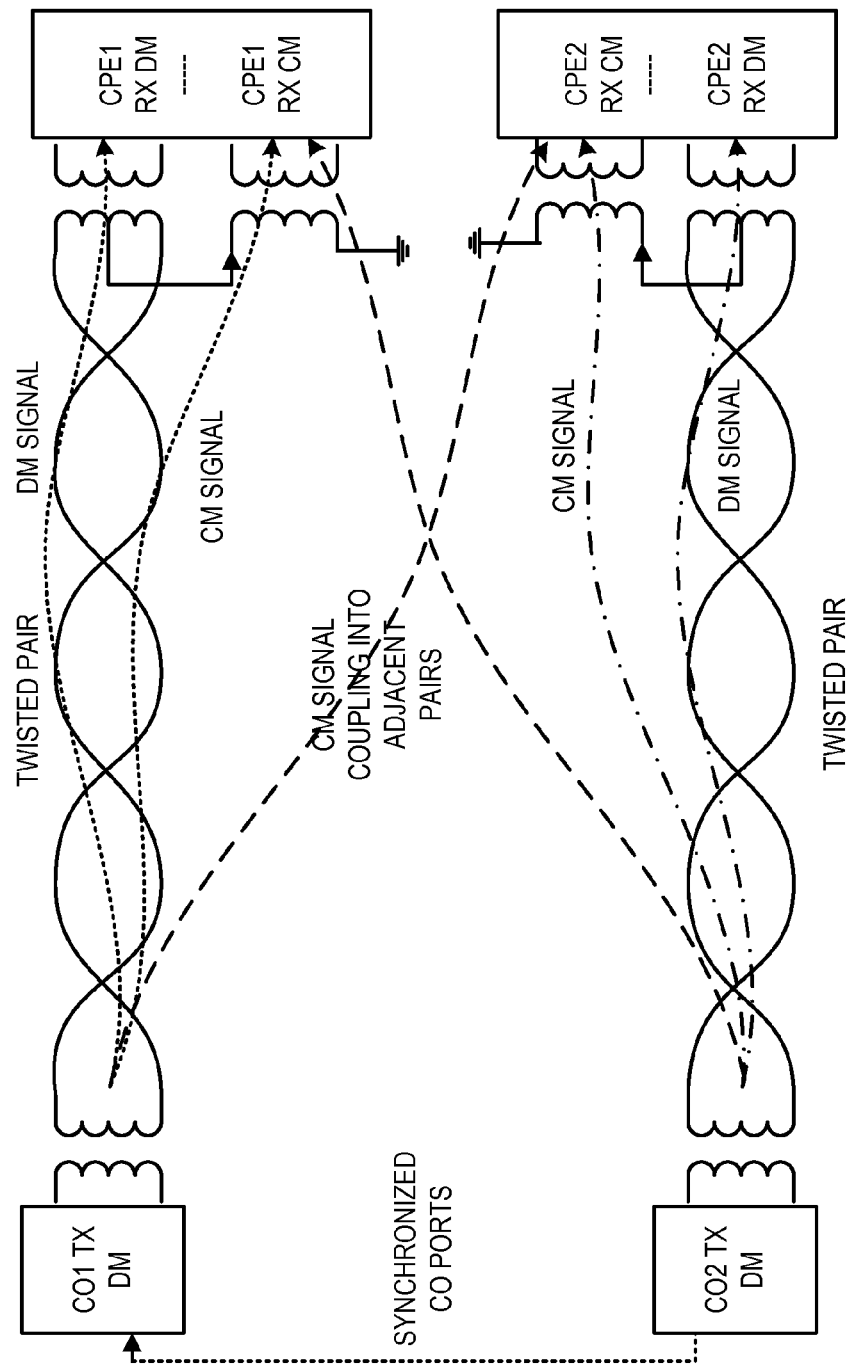
FIG. 6 illustrates how leakage may occur where the converted differential mode signal from a first transmitter is sensed by the CM sensor of another differential pair.

In accordance with some embodiments where multiple transmitters are frequency locked and aligned, as in a vectored system (cfr. G.993.5), each probing signal sequence that is transmitted is modulated by an orthogonal sequence and demodulated coherently using the same (known) orthogonal sequence. The specific orthogonal sequence used to modulate the constellation points of the Medley symbol over the orthogonal sequence duration uniquely identifies the contribution of the distinct DM transmitters into the CM signal measured on any given CM sensor. As illustrated in FIG. 6, in some scenarios, it is possible for leakage to occur where the converted differential mode signal from a first transmitter is sensed by the CM sensor of another differential pair. Various embodiments address this by the coherent demodulation of CM signals over the period of orthogonality of the orthogonal sequence, which allows one to completely eliminate the CM cross-coupling from other pairs. This embodiment allows for the evaluation of the relative leakage level of DM signals from multiple users into the CM CPE receiver. In doing so, the embodiment provides for classification of which adjacent loop has more impact on the CPE receiver as an emitting source of CM signal or whether the loop under consideration connected to the CPE is the primary source of imbalance and acts as an antenna to signals injected by other adjacent loops.

Figure 7:
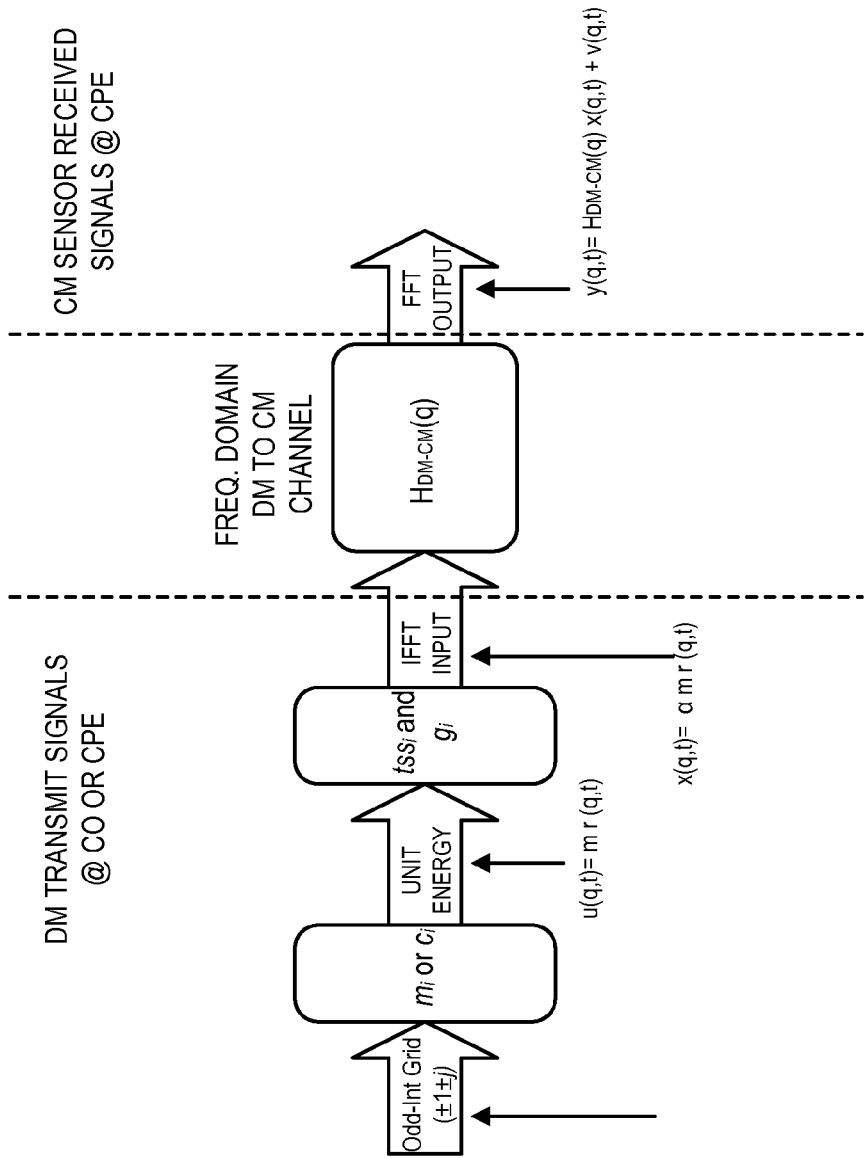
FIG. 7 illustrates the transmission of a probe signal and the coherent demodulation of the received signal.

A multi-tone signaling technique to estimate the TCL coupling at the CPE is now described in accordance with various embodiments. Other techniques can also be considered. The technique can also be extended to TCTL at the CPE as well as the TCL and TCTL at the CO. Reference are made to FIG. 7 which illustrates the transmission of a probe signal and the coherent demodulation of the received signal. The equivalent mathematical model of the measured DM-to-CM transfer function is represented by a per-tone model. The equivalent frequency domain model of the measurement is illustrated in FIG. 7.

For a given tone q, let the received signal y at the FFT output for the CM receiver be expressed as:

$$y[q,t] = H_{TCL}[q] x[q,t] + v[q,t] \tag{3}$$

Where t represents the DMT symbol time instant, x is the differential mode CPE-side transmit signal input to the IFFT, v is the CM receiver side additive background noise, and $H_{TCL}[q]$ is here the DM-to-CM TCL transfer function, which is invariant with respect to time. At the transmitter side, the bits to be transmitted determine the complex constellation point r[q, t] on the odd integer grid (+/−1+/−j). These correspond to the 4-QAM known constellation points that are either 00 or 11, according to the orthogonal sequence used and scrambled by the quadrant scrambler. This constellation point is scaled by the corresponding constellation-size-dependent mi's to give a signal with unit average energy u[q, t]=mr[q, t] and then further scaled with the tssi and gi to give the transmit signal at the IFFT input x[q, t]=αu[q, t]=αmr[q, t] with the desired transmit PSD level on the differential line.

At the receiver side, during certain sequence of the training such as R-P-PROBE in half duplex or R-P-Channel-Discovery in full duplex during discovery or Sync symbols during Data Mode, the transmit information x[q, t] is known and can be generated. The estimate $\hat{h}_{TCL}$ of the channel can be processed for example under a minimum mean square error criteria (min(E[e[q, t]])) where the error to minimize is:

$$e[q,t]=y[q,t]-\hat{h}_{TCL}x[q,t] \quad (4)$$

Other criteria such as maximum likelihood or zero forcing may also be used. The TCL coupling transfer function loss $\hat{h}_{TCL}$ is estimated and as a result, the LCL transfer function loss can also be estimated. Specific probe sequences not defined by the ITU VDSL2 or ADSL2 standard are not required. This estimation of the transfer function from DM to CM $H_{DM-CM}[q]$ is simply based on the correlation of the received CM signal with a given reference sequence of any probe signal transmitted by a particular user over a period of the orthogonal sequence. This means, in a vectored system as illustrated in FIG. 6 the receiver is able to derive an estimate of the DM-to-CM cross-coupling transfer function $H_{DM-CM}[q]$ of any differential signals from any user into the CM sensor under consideration. For example, in FIG. 6 the TCTL transfer function from CO transceiver 2 into CPE receiver 1 can be estimated by correlating the received CM signal with any orthogonal sequence associated with each user as long as the CPE has knowledge of the different orthogonal sequences of the vectoring system.

Figure 8:
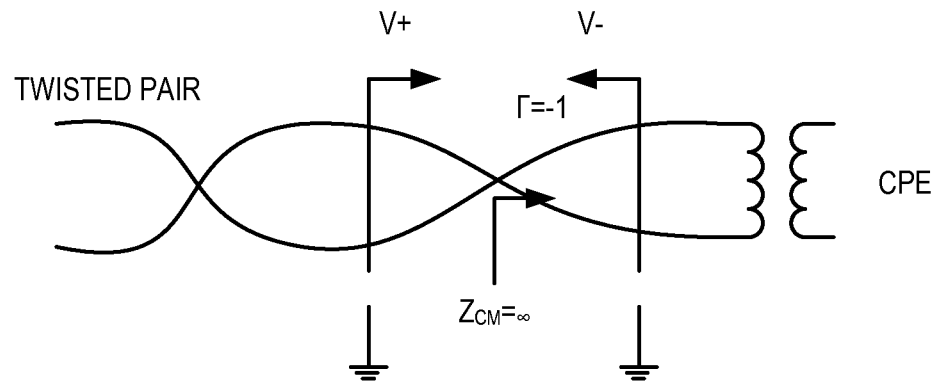
FIG. 8 illustrates the AIC of FIG. 1 coupled to tip and ring.
Figure 8:
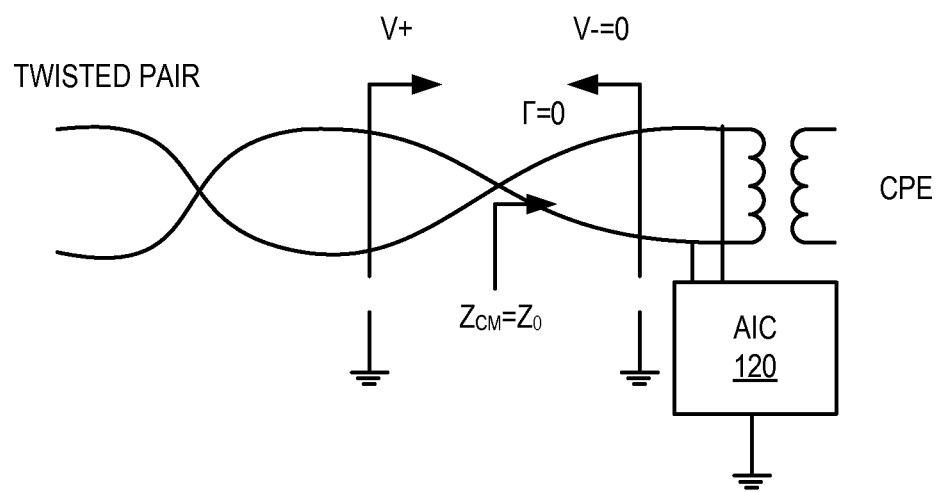

Various embodiments are directed to measuring loop imbalance in a loop and conveying the measurement, thereby providing a means for mitigating loop imbalance at the CPE. In order to reduce the amplitude of common mode signals on a loop or to reduce the conversion of these common mode signals into undesirable differential mode signals, an adaptive impedance matching circuit (AIC) (FIG. 1 120) is implemented that is coupled to tip, ring, and ground at the DSR CPE. As the CM sensor 118 is configured to receive CM signals, the AIC can be learned and/or updated based on measurements obtained by the CPE on the common mode. Reference is made to FIG. 8, which illustrates the AIC 120 of FIG. 1 coupled to tip and ring. The AIC 120 can be configured to reduce the amount of reflection of incoming CM signals (represented as V+) on the transformer termination that typically presents a high impedance for CM signals. The reflection wave (V−) for an infinite CM impedance creates CM standing waves on the loop, which is then converted to differential mode (DM) noise at any point of imbalance on the loop. By matching the CM impedance of the transceiver to the impedance of the loop, the reflection wave (V−) is not reflected and the amount of energy on the loop that may convert to a DM signal is reduced accordingly.

Figure 9:
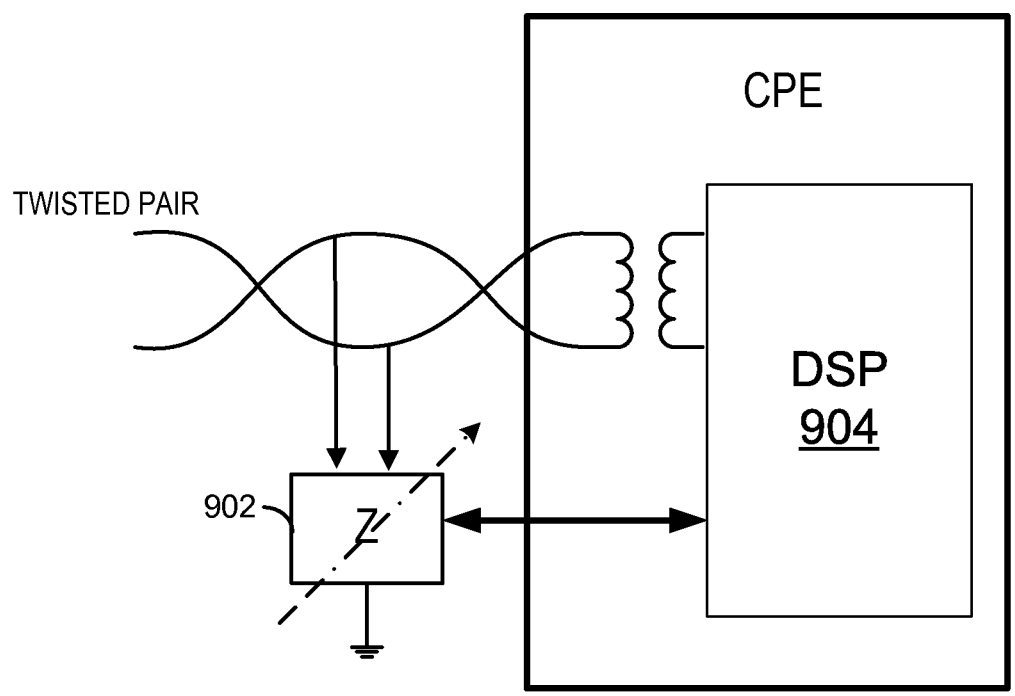
FIG. 9 illustrates an adjustable AIC implemented in the analog front end of the CPE in order to adjust the CM impedance.

With reference to FIG. 9, an adjustable AIC 902 is implemented in the analog front end of the CPE in order to match the CM impedance, thereby resulting in no reflection at the CPE. This eliminates CM standing waves and reduces to a certain extent, the CM-to-DM noise energy conversion. The AIC 120 is configured to provide an adjustable, complex impedance. For various embodiments, the AIC 120 can be comprised of discrete adjustable components (such as resistors and capacitors) or implemented in an integrated circuit, where the AIC 120 is controlled by an adaptive algorithm running on the CPE CM and/or DM receivers. Hardware support for the AIC 120 can be integrated in the analog front end and adaptation may be performed via firmware running on a DSL digital signal processing (DSP) platform 904.

The adaptation process can be performed in various ways. For some embodiments, the adaptation process can be performed according to different criteria associated with the received DM signal, where adaptation is performed during the training sequence and/or during data mode as defined in the ITU-T G992.3/993.5 specifications. Specifically, such sequences include, for example, the use of O-P-Channel-Discovery mode for TCTL measurements, R-P-Channel-Discovery mode for TCL measurements during discovery phase, the use of O/R-P-Medley sequences in analysis phase, or the use of sync symbols transmitted during data mode. The different criteria associated with the received DM signal may include, for example, the average received power of the received DM signal in the time domain or a correlation factor derived per tone or per group of tones in the frequency domain.

Figure 10:
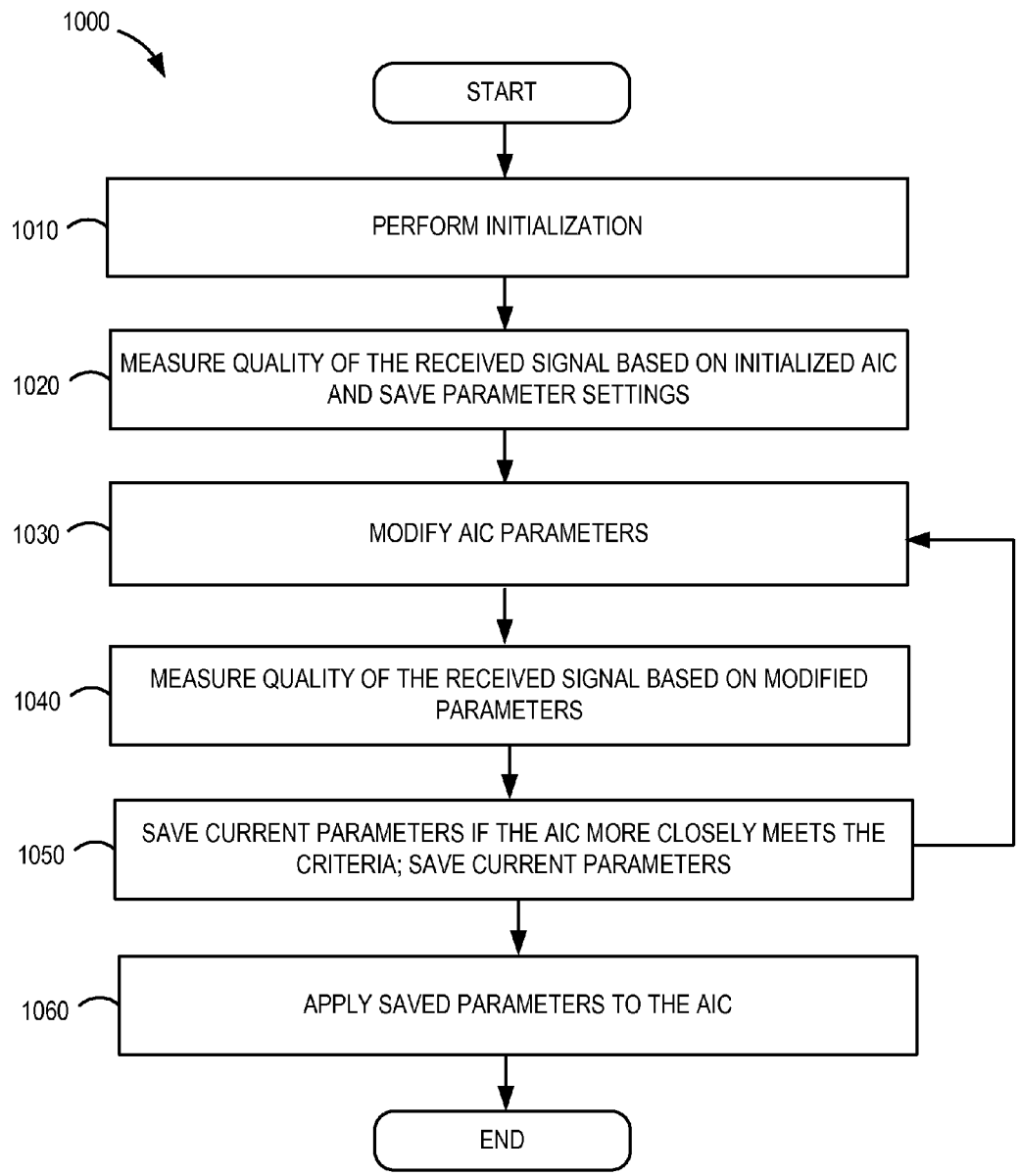
FIG. 10 depicts a flowchart 1000 in accordance with an embodiment for adaptively training the AIC 120 of FIG. 1.

Reference is made to FIG. 10, which depicts a flowchart 1000 in accordance with an embodiment for adaptively training the AIC 120 of FIG. 1. If embodied in software, each block depicted in FIG. 10 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor implemented in the CPE 110 or the CO 130 in FIG. 1. The machine code may be converted from the source code, etc. If embodied in hardware, each block may represent a circuit or a number of interconnected circuits to implement the specified logical function(s).

Although the flowchart 1000 of FIG. 10 shows a specific order of execution, it is understood that the order of execution may differ from that which is depicted. In accordance with one embodiment, a method for determining operating parameters for the AIC comprises an initialization phase where the AIC and the receive path (which comprise, for example, analog front end modules, digital filters, or FFT modules) are initialized with default parameters (block 1001). In block 1020, under this default setting, a measure of the quality of the received signal is processed as described earlier and saved as a default value. In block 1030, the AIC parameters are modified, and a new measurement is performed in block 1040. If this measurement more closely meets the criteria (e.g., more closely meets a defined time domain power threshold or a degree of correlation in the frequency domain) than the previous measurement, the new measurement and the associated set of AIC parameters are replacing the previously-saved values (block 1050). Processing resumes at block 1003, where blocks 1030 to 1050 are executed again. This is performed until all the AIC parameters have been tested. When all the AIC parameters have been tested, the saved set of parameters (representing the optimum settings for the AIC) is applied in block 1060.

Note that the adaptation process described above is performed based on a received DM signal. This is just one of various possible implementations. The method can be expanded to operate on received CM signals available on the second sensor of a dual sensor receiver CPE. For some embodiments, a convergence criteria of the AIC parameters can be based on the estimate of the TCL and TCTL coupling transfer function in the band of interest. During the different probe sequences as defined by the ITU standard, the AIC may undergo training under such criteria as maximization of the loss of the TCL or TCTL transfer function of a particular user undergoing evaluation in the frequency band of interest. The AIC can also be trained to maximize the TCTL/TCL loss of a specific external user as described earlier in connection with FIG. 7. Under such criteria whereby component values of the complex impedance network are adjusted, the imbalance measurement as seen by the CPE loop termination is minimized, thereby reducing the ability of CM signals to be converted to DM signals.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for performing 2-wire line imbalance measurements, comprising:
    receiving a probe signal comprising a known sequence type at a predetermined power spectral density (PSD) level on a differential input of the 2-wire line; and
    based on the probe signal and the known sequence type and predetermined PSD level, determining one of more of: an estimated transverse conversion loss (TCL) coupling transfer function and an estimated transverse conversion transfer loss (TCTL) coupling transfer function.

2. The method of claim 1, further comprising adjusting a line impedance with respect to the ground between two transceivers based on either one or both the TCL coupling transfer function and the TCTL coupling transfer function.

3. The method of claim 1, wherein receiving the probe signal comprises receiving the probe signal by a dual sensor receiver implemented in a front end of a transceiver.

4. The method of claim 3, wherein the dual sensor receiver comprises a differential mode (DM) sensor configured to receive DM signals and a common mode (CM) sensor configured to receive CM signals.

5. The method of claim 1, wherein the estimated TCL coupling transfer function and the estimated TCTL coupling transfer function are obtained during a training period involving two transceivers.

6. The method of claim 5, wherein the training period is defined in the International Telecommunication Union (ITU) G.992.3/G993.2/G993.5 standard for DSL systems and ITU standard G.996.0/G.997,2 for G.hn systems.

7. The method of claim 1, wherein the estimated TCL coupling transfer function and/or the estimated TCTL coupling transfer function are obtained during data mode using one of: data symbols and sync symbols.

8. A method for performing imbalance measurements, comprising:
    receiving, at a dual sensor receiver implemented in a transceiver, a probe signal comprising a known sequence type at a predetermined power spectral density (PSD) level on a differential input of a loop to be measured;
    determining, based on the probe signal and the known sequence type and predetermined PSD level, parameters for an impedance matching circuit (AIC) coupled to the loop between two or more transceivers; and
    applying the determined parameters to the AIC to mitigate common mode noise on the loop.

9. The method of claim 8, wherein determining parameters for an AIC comprises:
    adjusting one or more of the parameters of the AIC;
    determining whether with the adjusted parameters convergence towards a predetermined criteria is achieved;
    based on how the convergence under the current set of adjusted parameters is achieved relative to the convergence under the previous set of adjusted parameters, storing and applying the current set of adjusted parameters.

10. The method of claim 9, wherein storing the current set of adjusted parameters is performed if the current set of adjusted parameters more closely converges towards the criteria than a previous set of adjusted parameters.

11. The method of claim 9, wherein the predetermined criteria comprises a target threshold for signal power of a signal received at the receiver.

12. The method of claim 11, wherein the signal power of a signal received at the CPE is expressed in the time domain.

13. The method of claim 11, wherein the signal power of a signal received at the CPE is expressed in the frequency domain.

14. The method of claim 11, wherein signal received is a common mode signal,

15. The method of claim 11, wherein signal received is a differential mode signal.

16. The method of claim 9, wherein the predetermined criteria comprises maximization of one or more of: transverse conversion loss (TCL) and transverse conversion transfer loss (TCTL), 17. The method of claim 9, wherein the predetermined criteria comprises maximization of one or more of: transverse conversion loss (TCL) and/or transverse conversion transfer loss (TCTL) between two primary transceivers under evaluation connected to a same line and a third transceiver connected to an adjacent line, and wherein the two primary transceivers and the third external transceiver are part of a vectored system.

18. The method of claim 8, wherein determining parameters for an AIC is performed during one or more of: a training period and a data mode involving two transceivers, 19. The method of claim 18, wherein the training period and data mode are defined in the International Telecommunication Union (ITU) G.992.3 and/or G.993.2 and/or G.993.5 standards and/or G.996,0 and/or G.997.2.

20. An apparatus for performing imbalance measurements, comprising:
    a sensor circuit configured to receive a probe signal comprising a known sequence type at a predetermined power spectral density (PSD) level on a differential input on a loop under test, the sensor circuit further configured to determine one or more of based on the probe signal: an estimated transverse conversion loss (TCL) coupling transfer function and an estimated transverse conversion transfer loss (TCTL) coupling transfer function based on a dual sensor receiver.

21. The apparatus of claim 20, further comprising an adjustable impedance circuit configured to adjust a line impedance with respect to ground and between two transceivers based on the TCL coupling transfer function and the TCTL coupling transfer function.

22. The apparatus of claim 20, wherein the probe signal comprises a differential mode signal; and wherein the sensor circuit comprises a differential mode sensor and a common mode sensor, wherein the sensor circuit is configured to measure a common mode voltage output based on the differential mode signal.

\* \* \* \* \*

UNITED STATES PATENT AND TRADEMARK OFFICE
CERTIFICATE OF CORRECTION

PATENT NO. : 8,687,770 B2  
APPLICATION NO. : 13/095421  
DATED : April 1, 2014  
INVENTOR(S) : Laurent Francis Alloin et al.

Page 1 of 1

It is certified that error appears in the above-identified patent and that said Letters Patent is hereby corrected as shown below:

In the Claims:

In Column 9, Line 53, in Claim 6, delete "G.996.0/G.997,2" and insert -- G.996.0/G.997.2 --, therefor.

In Column 10, Line 27, in Claim 14, delete "signal," and insert -- signal. --, therefor.

In Column 10, Line 33, in Claim 16, delete "(TCTL)," and insert -- (TCTL). --, therefor.

In Column 10, Line 44, in Claim 18, delete "transceivers," and insert -- transceivers. --, therefor.

In Column 10, Line 48, in Claim 19, delete "G.996,0" and insert -- G.996.0 --, therefor.

Signed and Sealed this  
Seventeenth Day of June, 2014

Michelle K. Lee  
*Deputy Director of the United States Patent and Trademark Office*